(12) United States Patent
Duperon et al.

(10) Patent No.: US 12,194,399 B2
(45) Date of Patent: Jan. 14, 2025

(54) RAKE SYSTEM AND METHOD

(71) Applicants: Terry Duperon, Saginaw, MI (US); Kenneth Blanchard, Sanford, MI (US); Daniel Courser, Jr., Columbiaville, MI (US)

(72) Inventors: Terry Duperon, Saginaw, MI (US); Kenneth Blanchard, Sanford, MI (US); Daniel Courser, Jr., Columbiaville, MI (US)

( * ) Notice: Subject to any disclaimer, the term of this patent is extended or adjusted under 35 U.S.C. 154(b) by 0 days.

(21) Appl. No.: 18/188,751

(22) Filed: Mar. 23, 2023

(65) Prior Publication Data

US 2023/0330571 A1    Oct. 19, 2023

Related U.S. Application Data

(63) Continuation of application No. 17/930,216, filed on Sep. 7, 2022, now Pat. No. 11,617,976, which is a continuation of application No. 15/461,602, filed on Mar. 17, 2017, now Pat. No. 11,577,185, which is a continuation-in-part of application No. 14/326,548, filed on Jul. 9, 2014, now abandoned.

(60) Provisional application No. 61/843,948, filed on Jul. 9, 2013.

(51) Int. Cl.
| | | |
|---|---|---|
| *B01D 33/41* | (2006.01) |
| *B01D 29/03* | (2006.01) |
| *B01D 29/44* | (2006.01) |
| *B01D 29/64* | (2006.01) |
| *B01D 33/333* | (2006.01) |
| *B01D 33/46* | (2006.01) |
| *B01D 33/80* | (2006.01) |
| *B01D 35/30* | (2006.01) |

(52) U.S. Cl.
CPC ............. *B01D 33/41* (2013.01); *B01D 29/03* (2013.01); *B01D 29/445* (2013.01); *B01D 29/6484* (2013.01); *B01D 33/333* (2013.01); *B01D 33/466* (2013.01); *B01D 33/801* (2013.01); *B01D 35/30* (2013.01)

(58) Field of Classification Search
None
See application file for complete search history.

(56) References Cited

U.S. PATENT DOCUMENTS

| | | |
|---|---|---|
| 2,751,087 A | 6/1956 | Wallquist |
| 3,731,814 A | 5/1973 | Walters |
| 4,186,091 A | 1/1980 | Sutton |
| 4,709,804 A | 12/1987 | Duperon |
| 5,425,875 A | 6/1995 | Duperon |
| 5,618,415 A | 4/1997 | Johnson |
| 6,294,085 B1 | 9/2001 | Bache |
| 6,869,524 B1 | 3/2005 | Seidl |
| 7,048,850 B2 | 5/2006 | Depaso |
| 7,300,572 B2 | 11/2007 | Depaso |
| 7,393,451 B2 | 7/2008 | Wunsch |

(Continued)

*Primary Examiner* — Benjamin M Kurtz

(57) ABSTRACT

A rake system and method may include a framework, a chain, an elongated rail, a support arm, and an engagement feature. The elongated rail may be pivotably connected to the framework. The support arm may be connected to the elongated rail at a first point and may be pivotably connected to the framework at a second point. The engagement feature may be connected to the support arm and may be configured to engage the chain. The rake system may be configured to discard debris.

28 Claims, 16 Drawing Sheets

(56) References Cited

U.S. PATENT DOCUMENTS

| | | |
|---|---|---|
| 7,575,764 B2 | 8/2009 | Chang |
| 7,722,762 B2 | 5/2010 | Zubair |
| 7,776,212 B2 | 8/2010 | Wunsch |
| 11,577,185 B2 * | 2/2023 | Duperon .............. B01D 33/801 |
| 2003/0189015 A1 | 10/2003 | Kaltchev |
| 2011/0049039 A1 | 3/2011 | Duperon |

* cited by examiner

RAKE SYSTEM AND METHOD

CROSS-REFERENCE TO RELATED APPLICATIONS

This application is a continuation of U.S. patent application Ser. No. 17/930,216, filed on Sep. 7, 2022, which is a continuation of U.S. patent application Ser. No. 15/461,602, filed on Mar. 17, 2017, which is a continuation of U.S. patent application Ser. No. 14/326,548, filed Jul. 9, 2014, which claims the benefit of U.S. Provisional Patent Application Ser. No. 61/843,948, filed on Jul. 9, 2013. The disclosures of all of the foregoing are hereby incorporated by reference in their entireties as though fully set forth herein.

TECHNICAL FIELD

This application deals with an apparatus for removing debris from water containing debris. Such apparatus may be found generally in wastewater clean-up situations for example, in municipal sewage systems and the like.

OVERVIEW

What is disclosed and claimed herein are apparatuses, methods and novel component parts for removing debris from water. Novel component parts include among other, dual wiper blades, flexing apparatus for moving the chain of the chain drive of the apparatus whenever large materials are carried on the skimmers, pivotal drive head that works in conjunction with the flexing apparatus if both are installed on the apparatus, and a pivoting closure cap, rotating effector plates, along with modules of each of these novel components, in addition to a novel secondary skimmer device useful with primary skimming devices.

In a first embodiment, there is a component part which is a flexing apparatus for a flex rake.

A second embodiment of this disclosure is a rake screen apparatus having a flexing apparatus of mounted to a framework of the rake screen apparatus.

Thus, what is disclosed is a flexing apparatus for a flex rake. The flexing apparatus comprises a pair of elongated rails, each rail having a top end, a bottom end, a first attachment point and a second attachment point. The first attachment point is located near the top end of each of the elongated rails, and each second attachment point is located near the bottom end of each said elongated rail.

A first support arm is attached at each attachment point, and each of the first support arms has a distal end, wherein each distal end is fixedly attached to the sidewall of an enclosure for the flexing apparatus.

Attached near each first support arm distal end is a second support arm for enhancing the movement of a chain and the bottom end and the top end of each elongated rail has a roller for enhancing the movement of a chain adjacent each elongated rail.

A third embodiment of this disclosure is a component part which is a dual wiper blade assembly for a rake system. The dual wiper blade assembly comprises a pair of support members each having a near end and a distal end, wherein each near end has a pivotal attachment capability for attaching to a framework of a rake system. The distal end of the support member has attached to it, holders, wherein each holder has a bottom edge.

Each bottom edge has a first notch in it and a spaced-apart second notch in it. There is a common first wiper blade attached in the first notches and a common second wiper blade surmounting the first wiper blade and attached in the second notches.

A fourth embodiment of this disclosure is a rake screen apparatus having a dual wiper blade assembly as set forth just Supra, mounted to a framework of the rake screen apparatus.

A fifth embodiment of this disclosure is a stand-alone modular unit comprising a bar screen, the modular unit configured to replace a bar screen in an existing rake screen apparatus.

In addition, there is an embodiment which is a stand-alone modular unit comprising a perforated plate assembly, wherein the modular unit is configured to replace a perforated plate assembly or bar screen in an existing rake screen apparatus.

An additional embodiment of this disclosure is a component which is a pivoting drive head apparatus for a rake screen. The pivoting drive head comprises a pair of spaced-apart, parallel support members, each parallel spaced-apart member having a near end, a distal end and a middle portion.

Each near end is pivotally attachable to a framework of a rake screen and each parallel support member is pivotally attached to a drive sprocket, wherein each drive sprocket is mounted on the ends of a common drive shaft therebetween. Each drive sprocket is attached to each respective parallel support member near the middle portion of the parallel support member. Each distal end of the parallel support member are configured as a stop foot. Each parallel support member, each sprocket and the common drive shaft are pivotable away from the rake screen framework.

Still further, there is an embodiment which is a rake screen apparatus having a pivoting drive head apparatus mounted to a framework of said rake screen apparatus. In addition, this arrangement can also have a flexing apparatus incorporated into the rake screen.

The rake screen apparatus can have a fixed drive head and a flexing apparatus in combination.

Yet, there is another embodiment of this disclosure which is a component which is a pivoting closure cap for a rake screen apparatus having side framework. The pivoting closure cap comprises a top panel, two mirror image side panels having edges and, top front corners, which is attached at the edges to the top panel. There is a back panel having edges and attached at the edges to the top panel and the side panels.

Each side panel is configured to accommodate any components extending beyond the side panels such that the components will not interfere with closure of the pivoting closure cap. There is a flexing enclosure lid, pivotably mounted at the top front corners of the side panels.

A sixth embodiment of this disclosure is a combination of a rake screen apparatus and a pivoting closing cap as set forth just Supra, in which the pivoting closing cap is mounted to the framework of the rake screen apparatus.

Further, there is an embodiment which is a rake screen apparatus containing in addition, in combination, a flexing apparatus, a dual wiper blade assembly, a pivoting drive head apparatus, a pivoting closure cap, a revolving effector plate apparatus, and a secondary skimming device that follows after the primary skimming device.

A seventh embodiment of this disclosure is a rake screen apparatus in which screens, drive mechanisms and enclosures are all modular, wherein each of the screens, drive mechanisms and enclosures can be removed or replaced without disassembling the entire rake screen apparatus.

An eighth embodiment of this disclosure are the modular components, for example, a screen module, a drive module containing a drive and a skimmer system, an enclosure module that has the ability to be modified to create clearance for various size debris moving through a rake screen, and a modular component for a rake screen that is a flexing apparatus, a rotational effector plate, along with a secondary skimming device.

A ninth embodiment of this disclosure is a rotational, moveable, effector module for use with a trash rake. The rotational, moveable, effector module comprises a frame, wherein the frame has a top end, and bottom end, and two sides.

There is a first common axle extending between the two sides near the top end and a second common axle extending between the two sides and located beneath the first common axle. The first common axle and the second common axle are drivably connected by a common drive assembly. The second common axle has a sprocket located at each end, each sprocket having a drive chain located on it, the chains having a lower end. The chains are not mounted on a sprocket at the lower end.

There is a plurality of cross members equally spaced between the chains and each cross member has mounted on it, skimmers. Each skimmer interfaces with a backside of a perforated plate filtration screen of a trash rack, and each shimmer has a leading edge.

Optionally, the leading edge of each primary skimmer in a flex rake has a thin, flexible sheet attached to it in a manner sufficient to apply a low, consistent force along a leading edge of the thin, flexible sheet, against a surface of a perforated screen.

The present disclosure provides methods of operating a rake system. For example and without limitation, a method may include providing a rake system having a framework, a chain including a plurality of skimmers, an elongated rail, a first support arm connected to the elongated rail at a first point and to the framework at a second point, a second support arm connected to the elongated rail at a third point and to the framework at a fourth point, the second support arm disposed lower that the first support arm, a first guide device connected to the first support arm, a second guide device connected to the second support arm, the first guide device and the second guide device configured to engage the chain, and the first guide device and the second guide device spaced apart from and not in direct contact with the elongated rail, and/or a screen, rotating the chain, receiving debris between the chain and the screen, and/or moving the debris along the screen, via a skimmer of the plurality of skimmers, to discard the debris.

DETAILED DESCRIPTION OF THE DISCLOSURE

Figure 1:
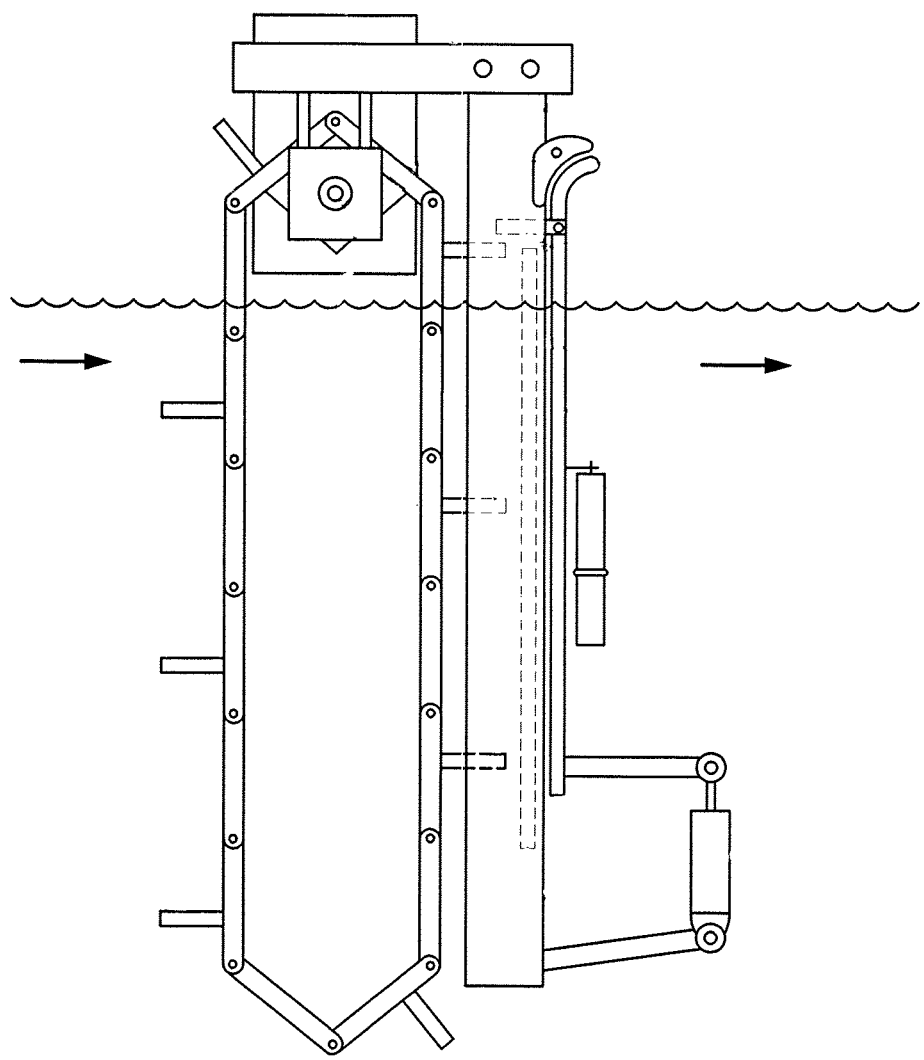
FIG. 1 is a full side view of a prior art flex rake for cleaning debris from water.

Turning now to the detailed description of the disclosure, there is shown in FIG. 1, a prior art flex rake apparatus 1 having a thin plate apparatus for removing debris from water. The purpose of inclusion of this in the disclosure is to show the conventional parts of such an apparatus.

Figure 2A:
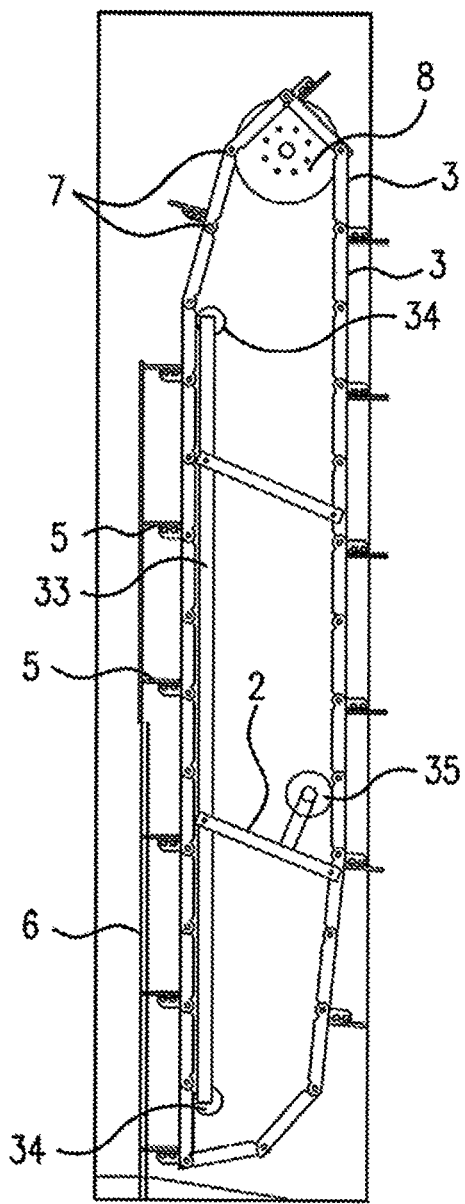
FIG. 2A is a full side view of a flexing apparatus of this disclosure mounted within a flex rake, inside the chain, in a normal operating position, wherein the drive head is stationary.
Figure 2B:
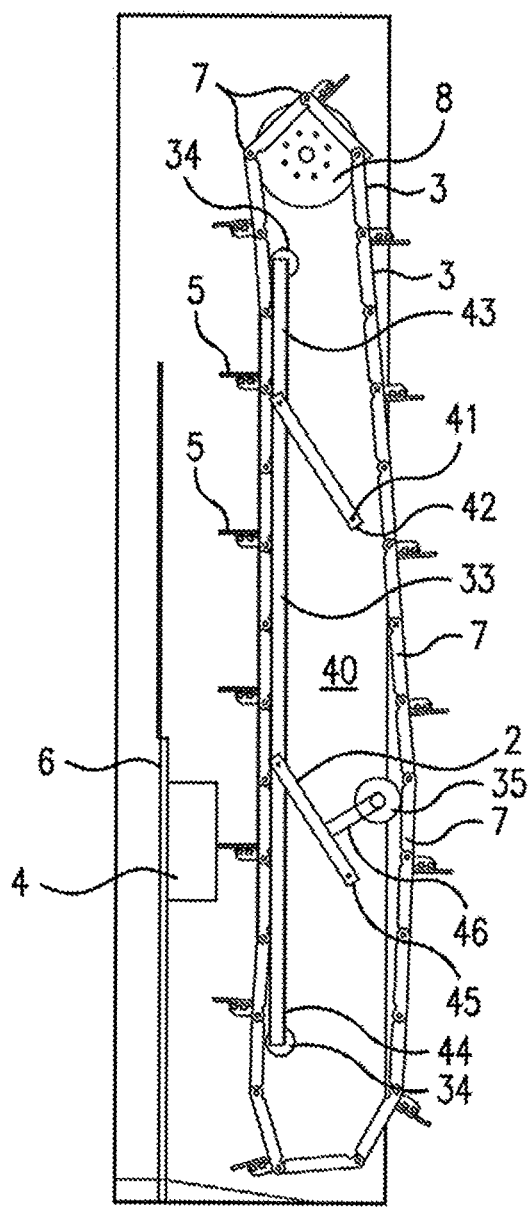
FIG. 2B is a full side view of a flexing apparatus of FIG. 2A wherein the flexing apparatus is in a flex position wherein the drive head is stationary.
Figure 2C:
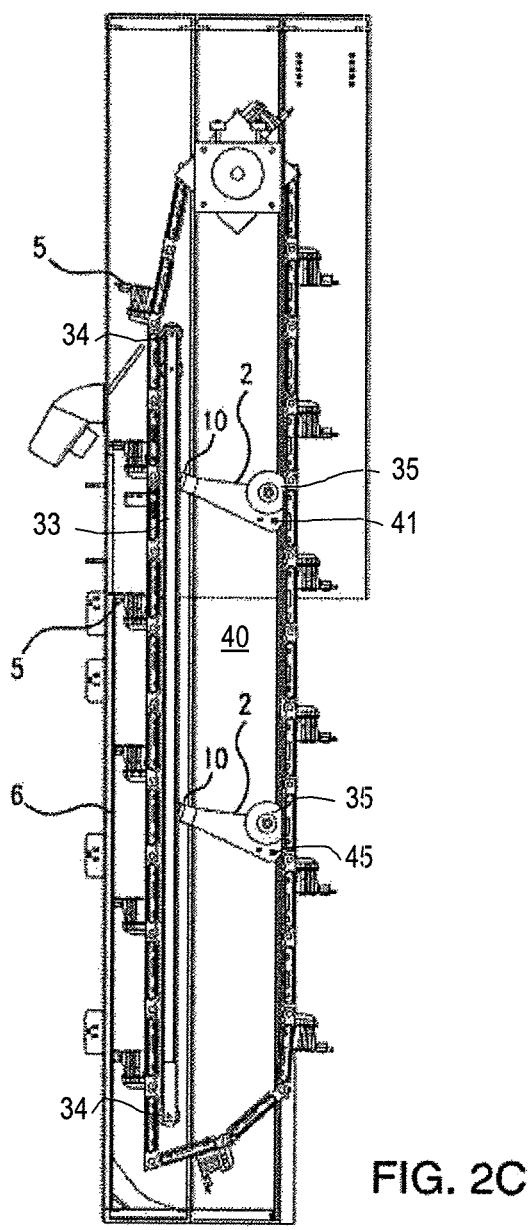
FIG. 2C is an enlarged full side view of a flexing apparatus of FIG. 2A showing detail of the mounting.

There is shown in FIG. 2A, which is a schematic of the internal apparatus of a flex rake, a portion of the first novel component of this disclosure. There is shown two, parallel elongated rails 33 (only one shown). There is a first support arm 2 used in conjunction with the pivotal head 8 (FIG. 4A) of the flex rake to move the drive chain 3 out of line with regard to any large object 4 (e.g., debris) (FIG. 2B) that is brought from the water to the surface for disposal and at the same time, maintaining the skimmers 5 in position near the screen 6. The large object 4 has a tendency to obstruct the apparatus and make it ineffective for the work that it is supposed to do. FIG. 2A shows the normal position of the chain 3, and FIG. 2B shows the chain 3 in a flexed position. FIG. 2C is an enlarged figure to show the mounting 10 of an upper and a lower first support arm 2 and the elongated rail 33. The distal end 42 of the upper first support arm 2 may be attached to a side wall 40 of a housing for the flex rake apparatus at attachment point 41 and the distal end of the lower first support arm 2 may be attached to the side wall 40 at attachment point 45. Also shown is a guide device 34 (e.g., a roller, a guide, a contour member, and/or an engagement feature) mounted at or about the top 43 and at or about the bottom 44 of the elongated rail 33. Each of the support arms 2 may have mounted on it at a distal end a guide device 35 (e.g., a roller, a guide, a contour member, and/or an engagement feature) configured to assist the movement of and/or engage the chain 7.

The pivoting drive head is comprised of a hinging drive head 8, drive sprocket 9, parallel support members 53.

When the flex rake is installed at 30 degrees from vertical, two mechanisms accomplish this. First, the weight of the chain 3 and skimmers 5 leaning at 30 degrees along the surface of the screen 6 along with the flexing capability of the flex links 7 (FIG. 2A) of the chain 3 creates skimmer contact with the screen 6 along with the ability to flex away for larger debris. The second feature that creates this functionality at 30 degrees is the hanging drive head (pivotal drive head) 8, FIGS. 4A to 4E. The pivotal drive head 8 and the drive sprocket 9 swing out of the way (See FIG. 4B) when large debris moves up to the top of the screen 6. In a vertical or near vertical application, this functionality is lost. At vertical or near vertical, the skimmers 5 do not push up against the screen 6, but instead they hang freely from the drive sprocket 9. This creates a problem because without the pressure of the skimmers 5 to the screen 6, debris can get between the skimmers 5 and the screen 6 and fall back down into the water channel.

In order to create this functionality at all angles including vertical, the inventors herein have created a novel disclosure that gives the same functionality at all angles. The pivotal head 8, the drive sprocket 9, and the support arm 2 are attached to the structure of the machine in such a way that they pivot to engage with the chain 3 in order to apply pressure to the skimmers 5 into the screen 6 while still allowing the chain links 7 to flex away from the screen 6 by pivoting out of the way.

This apparatus can be used in flex rakes having fixed drive heads, as well as pivotable drive heads. In prior apparatuses, the drive heads were not fixed, that is, they had to be pivotable in order to pass the obstructions provided by large objects. Now, there is a means of using fixed heads in such apparatuses. This component allows the flex rake to be used essentially vertically, or it can allow the flex rake to be used on an angle relative to vertical.

The pivotal drive heads 8 of this disclosure are also novel, in that, the same functionality can be had in all configurations of the flex rake. The pivoting drive head 8 can be used without the flexing apparatus in flex rakes installed at 15 degrees from vertical or higher.

Figure 4A:
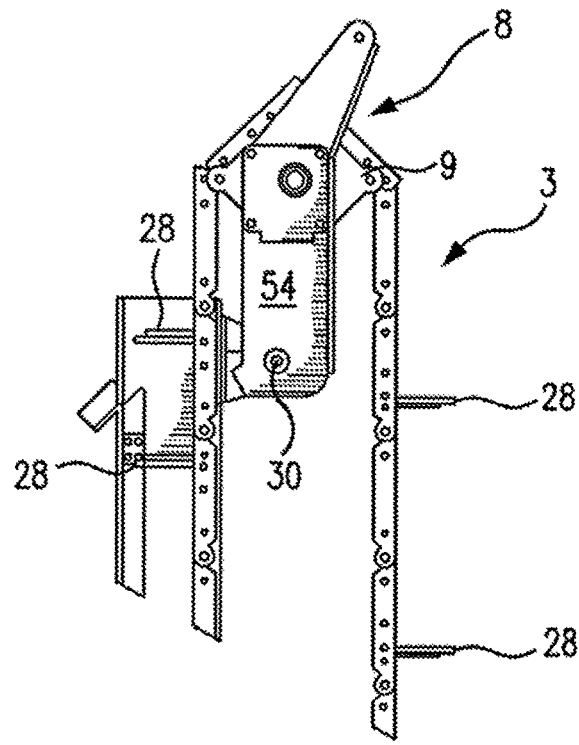
FIG. 4A is a full side view of the mounting apparatus for the pivotal drive head showing the normal operating position of the drive head.
Figure 4B:
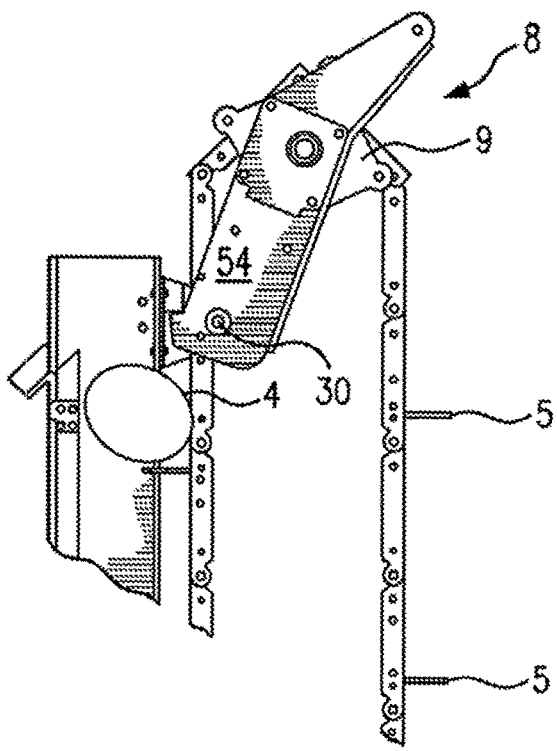
FIG. 4B is a full side view of the mounting apparatus for the pivotal drive head showing the pivoted position when a large object is encountered on the skimmer blade.
Figure 4C:
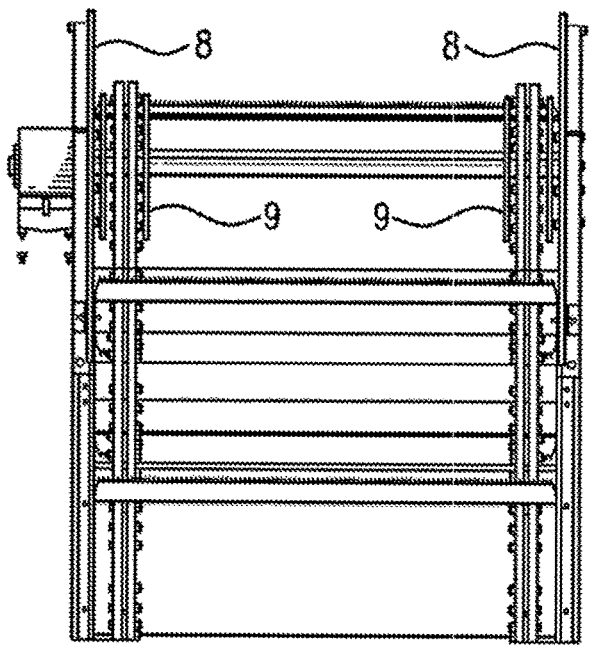
FIG. 4C is a full front view of the mounting apparatus for the pivotal drive head.
Figure 4D:
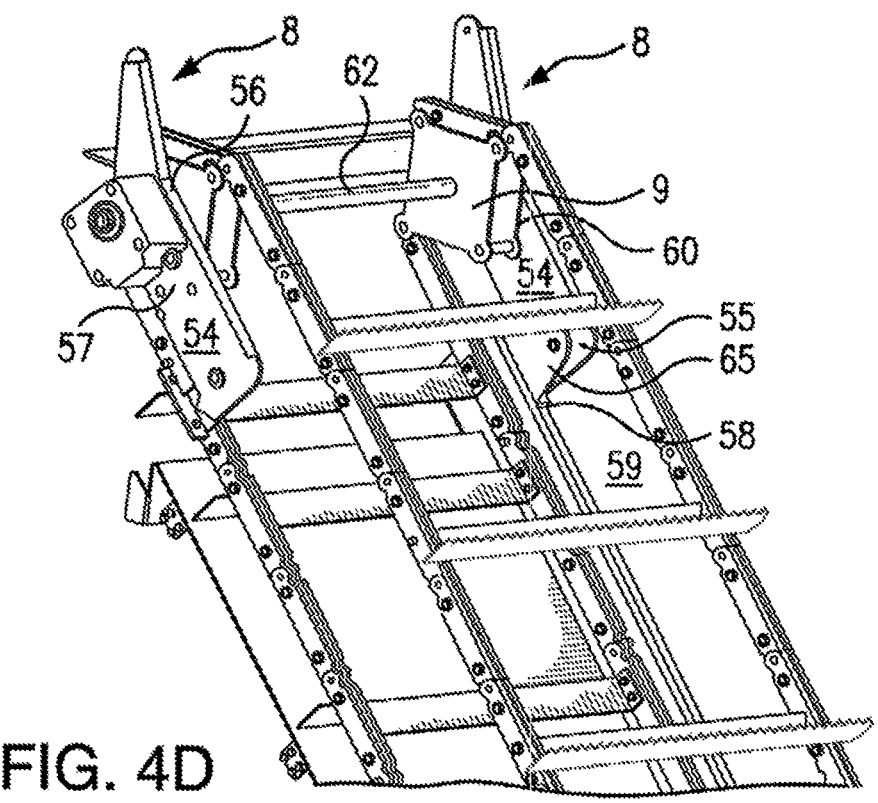
FIG. 4D is an isometric view of the mounting apparatus for the pivotal drive head.
Figure 4E:
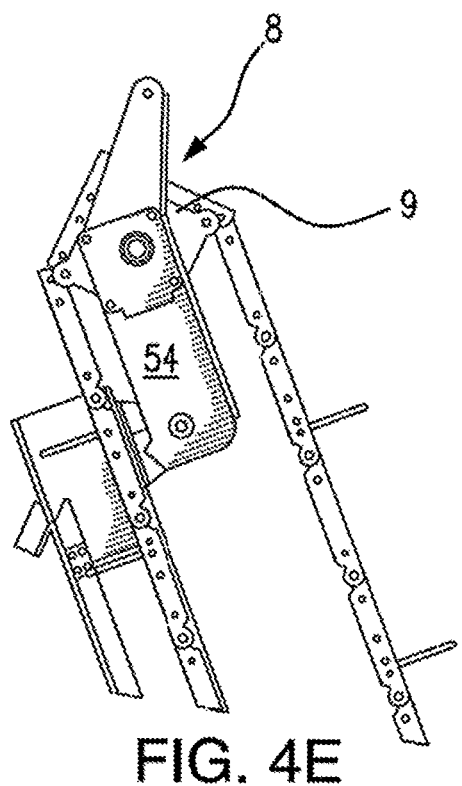
FIG. 4E is a full side view of the mounting apparatus for the pivotal drive head.
Figure 4F:
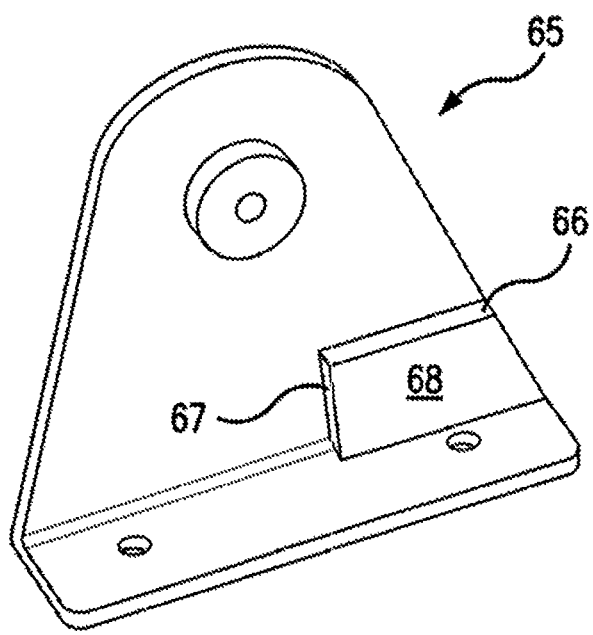
FIG. 4F is an enlarged view in perspective of a stop foot of this disclosure.
Figure 4G:
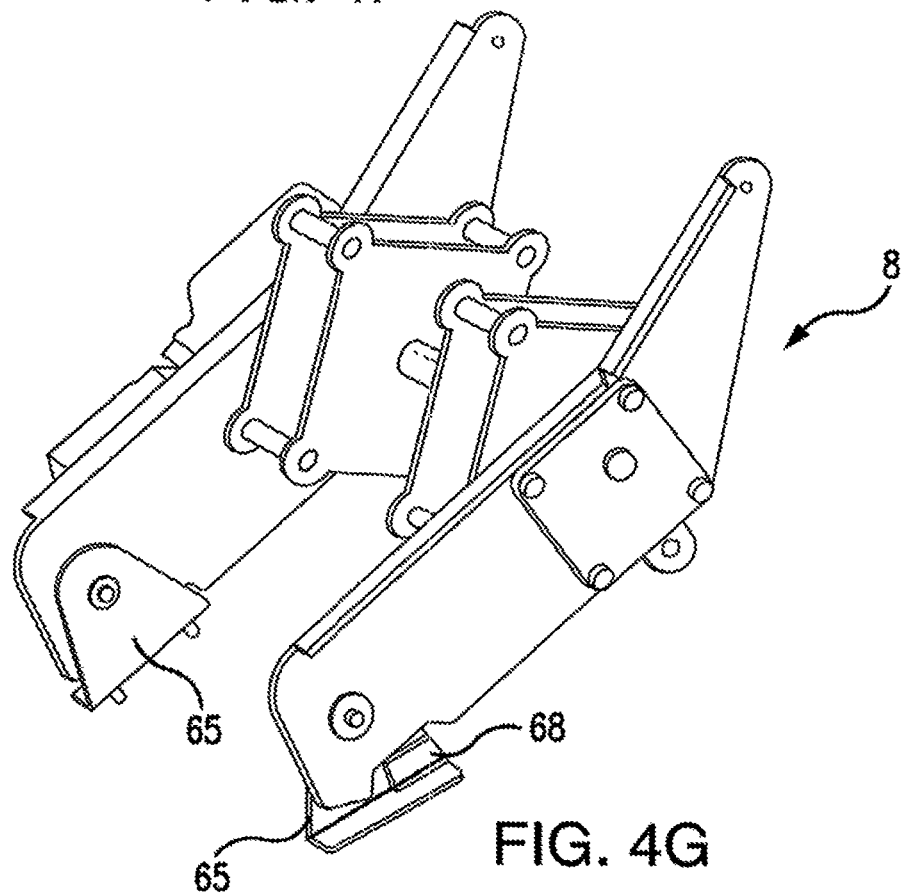
FIG. 4G is a view in perspective of a pivot head of this disclosure illustrating the placement of the stop foot.

A shown in FIG. 4A, the pivotal drive 8 head comprises a pair of space-apart, parallel support members 54, wherein each such member 54 has a near end 55, a distal end 56 and a middle portion 57 (see FIG. 4D). Each of the near ends 55 is pivotally attached at 58 to a framework 59 of the rake screen. Each member 54 is pivotally attached at 60 to a drive sprocket 9 that is mounted on the ends of a common drive shaft 62. Each of the drive sprockets 9 is attached to each respective parallel support member 63 near the middle portion 57 of the parallel support member 54. The distal end of the member 54 has attached thereto a stop foot 65 for the apparatus (see FIGS. 4F and 4G). The stop foot 65 has mounted on it a foot 68 having two faces 66 and 67. These two faces 66 and 67 are stop points for the rotation of the pivot head and essentially stop the pivot head 8 from a full rotation. The pivot head 8 can only rotate to the extent that it engages with one of the two faces 66 and 67. Each of the support members 54, sprocket 9 and the common drive shaft 62 are pivotable away from the rake screen framework to that extent.

The flexible chain links 7 function by holding pressure to the screen 6 using the weight of the chain links 7 and skimmers 5, then flexing out of the way for large debris 4 when the large debris 4 gets to the top of the screen. Instead of the drive head 8 swinging out of the way with the anchor points 30 above the drive head 8, it pivots out of the way with the anchor points 30 below the drive head 8. The pivoting drive head 8 can also be used in applications installed at 0 to 15 degrees in conjunction with the flexing apparatus.

Figure 3A:
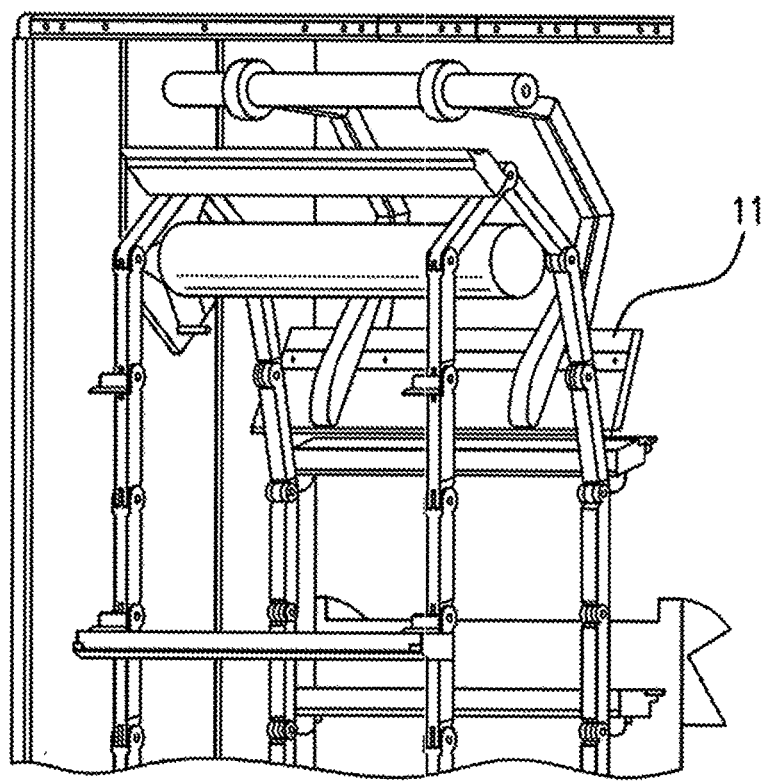
FIG. 3A is an isometric view of the dual wiper blade mounted on the flex rake apparatus.
Figure 3C:
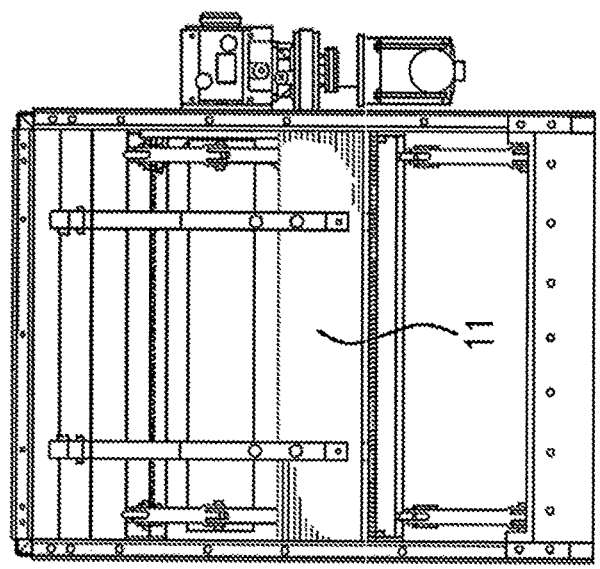
FIG. 3C is a full back view of the dual wiper blade apparatus mounted on the flex rake apparatus.
Figure 3B:
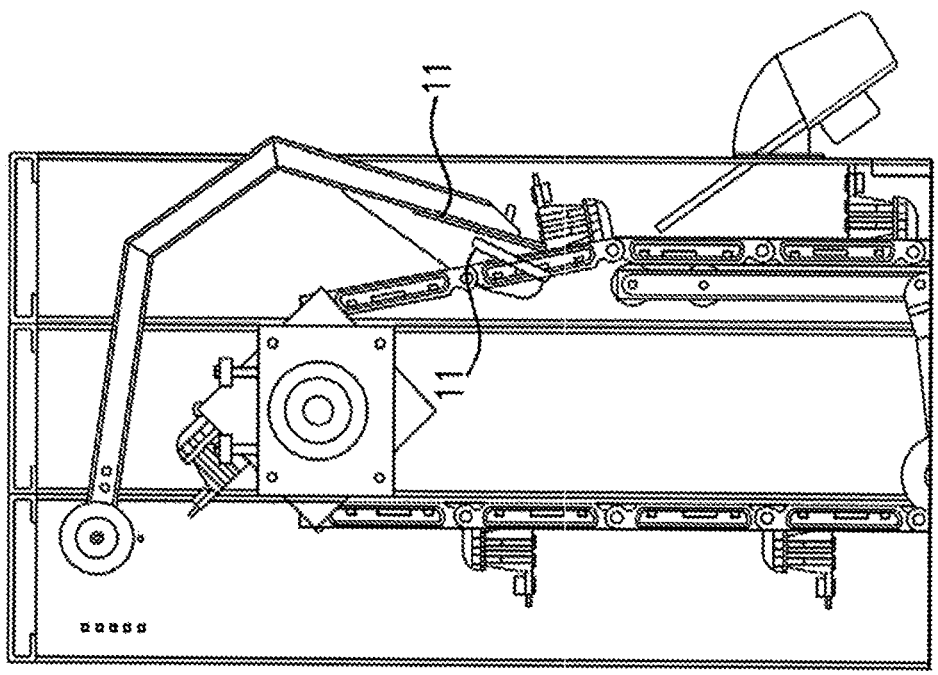
FIG. 3B is a full side view of the dual wiper blade apparatus mounted on the flex rake apparatus.

Turning now to the duel wiping blades 11 of this disclosure, there are several known debris blades currently in use, however, they are single wiper blade apparatuses. Wiper blades of this disclosure are shown in FIGS. 3A to 3H. One of the largest problems in the industry with cleaning skimmers 5 is the fact that they may not completely clean each skimmer or wipe the wrapped "rags" off when they swipe the skimmers 5. The novel duel blades 11 of this disclosure wipe each skimmer 5 twice each time that the skimmer 5 passes this cleaning mechanism. This ensures that debris is cleaned off the skimmer 5 by fully wiping the skimmer 5 at least two times. Shown in FIGS. 3A, 3B, and 3C, is the position of the dual wiper blades 11 within the flex rake apparatus.

Figure 3D:
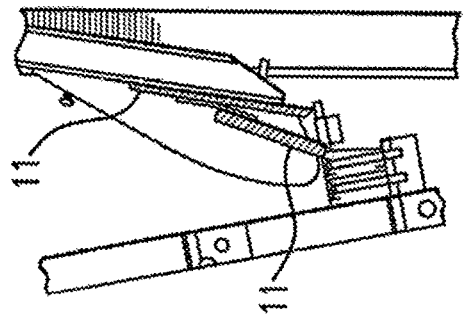
FIGS. 3D to 3H illustrate the progressive movement of the dual wiper blades across the skimmer moving from left to right.
Figure 3E:
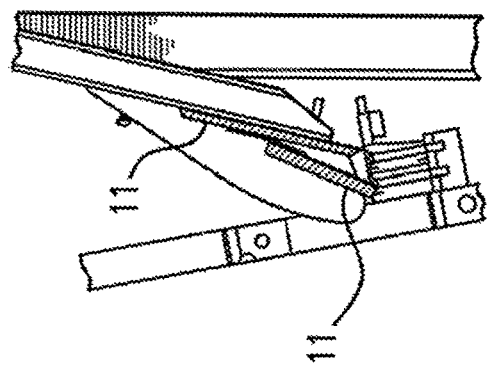
Figure 3F:
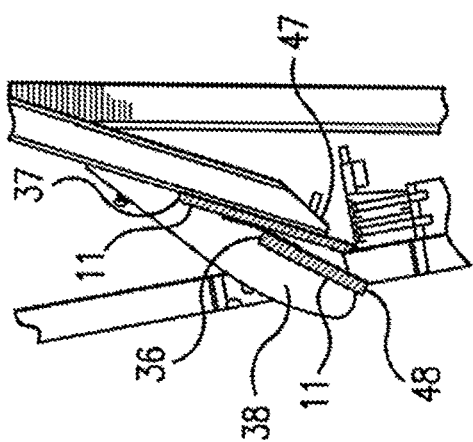
Figure 3G:
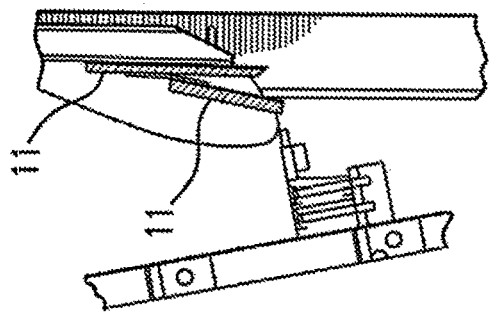
Figure 3H:
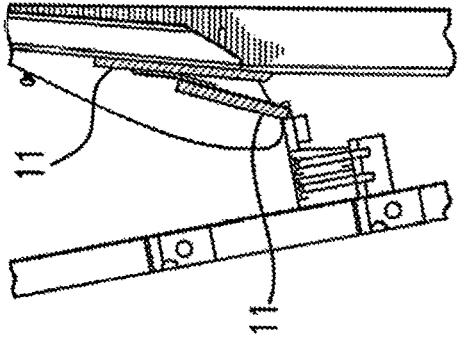

Shown in FIG. 3D is the first wiping blade 47 that is fixed in a first notch 37 in support 38 and second wiping blade 48 is fixed in a second notch 37 in support 38. Moving from FIG. 3D to FIG. 3H, the operation of the dual wiper blades 11 is shown.

Figure 6A:
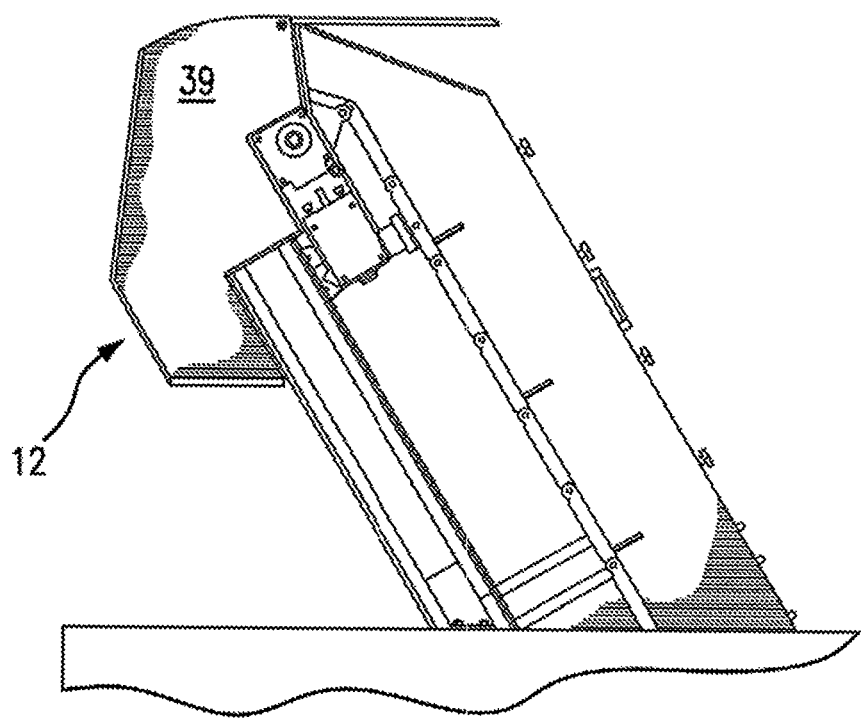
FIG. 6A is a full side view of the normal operating position of the enclosure cap.
Figure 6B:
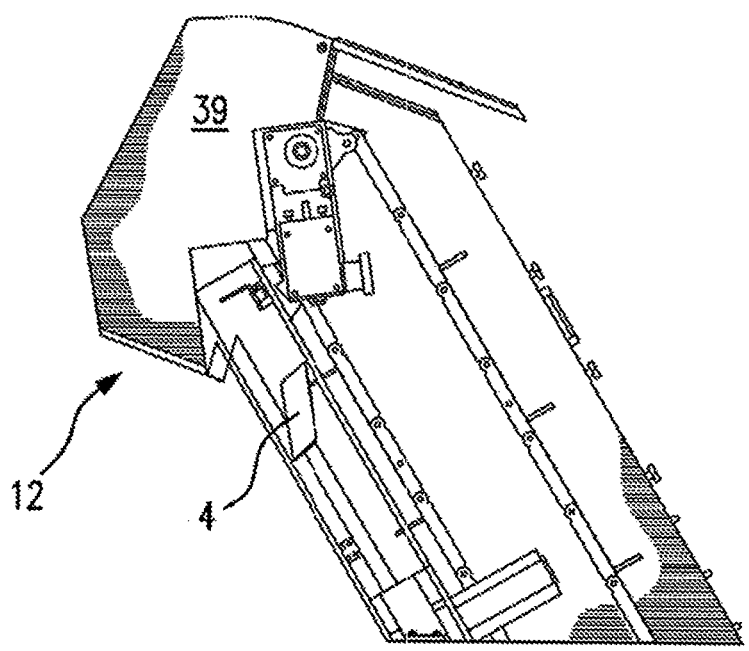
FIG. 6B is a full side view of the pivot out position of the enclosure cap of FIG. 6A.
Figure 6C:
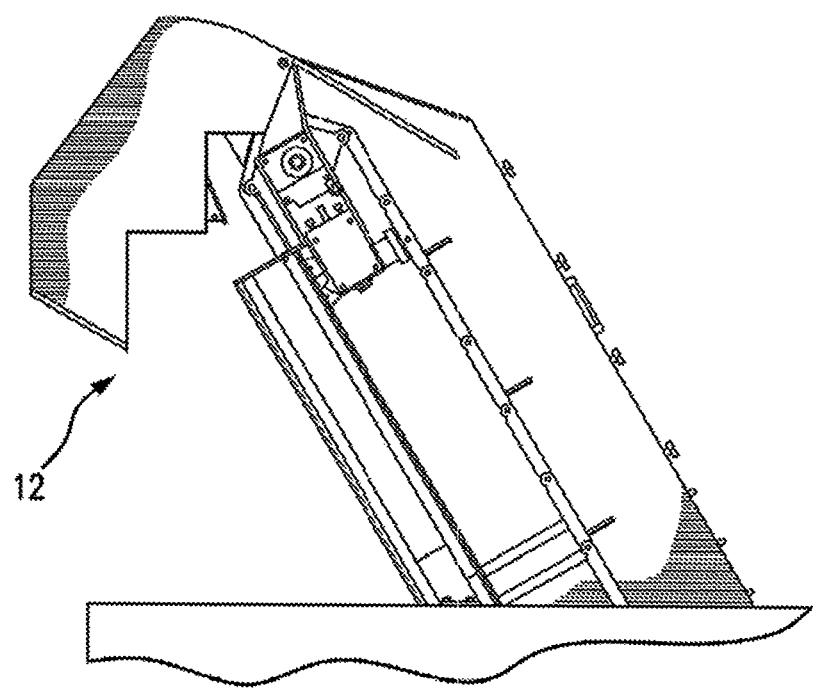
FIG. 6C is a full side view of the pivoting position for inspection of the interior of the enclosure cap and the pivot head.

The enclosure cap 12 of this disclosure is designed to cover the top of the flex rake and its top most components (See FIG. 6A). The enclosure cap 12 of this disclosure is also designed to allow the enclosure cap 12 to pivot out of the way (See FIG. 6B) when a large object 4 arrives at the top of the mechanism. In addition, the enclosure cap 12 of this disclosure will open widely to allow for the inspection and removal of debris that may become jammed in the apparatus (See FIG. 6C). the closure cap 12 is comprised of a top panel 49, a bottom panel 50, two side panels 51 (only one side shown) and a front panel 52. As shown in FIG. 6C, the cap 12 opens, or pivots away from the top of the flex rake apparatus to allow access into the interior of the flex rake upper area.

Figure 5C:
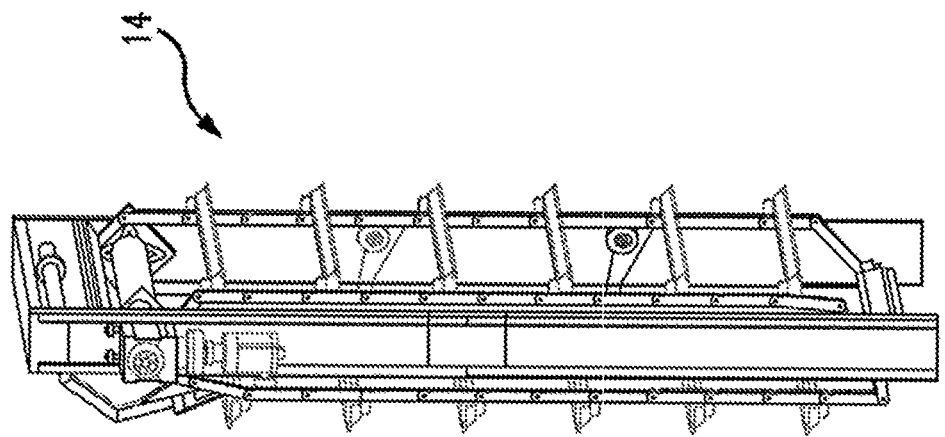
FIG. 5C shows a full view in perspective from the back of a drive module and flexing component.
Figure 5B:
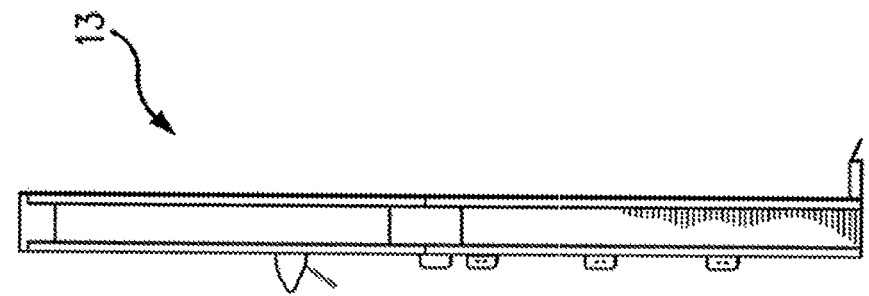
FIG. 5B shows a full side view of the screen module.
Figure 5A:
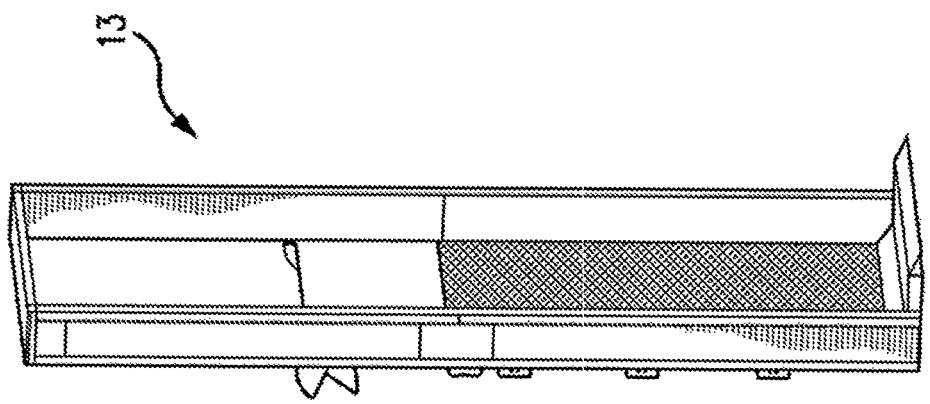
FIG. 5A shows a view in perspective from the front of a screen module.
Figure 5F:
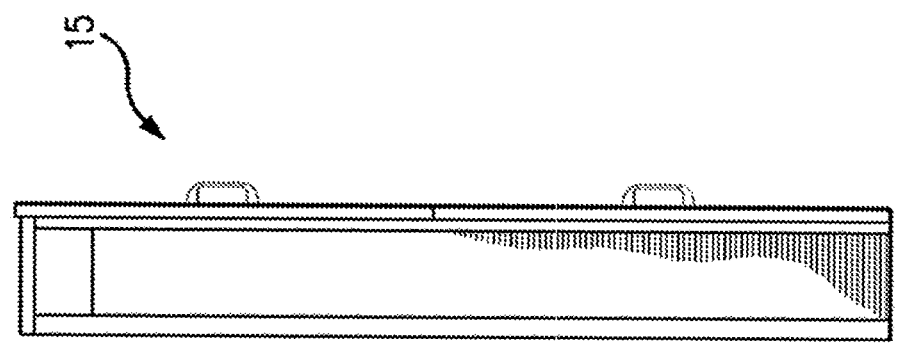
FIG. 5F is a full side view of the enclosure module of FIG. 5E.
Figure 5E:
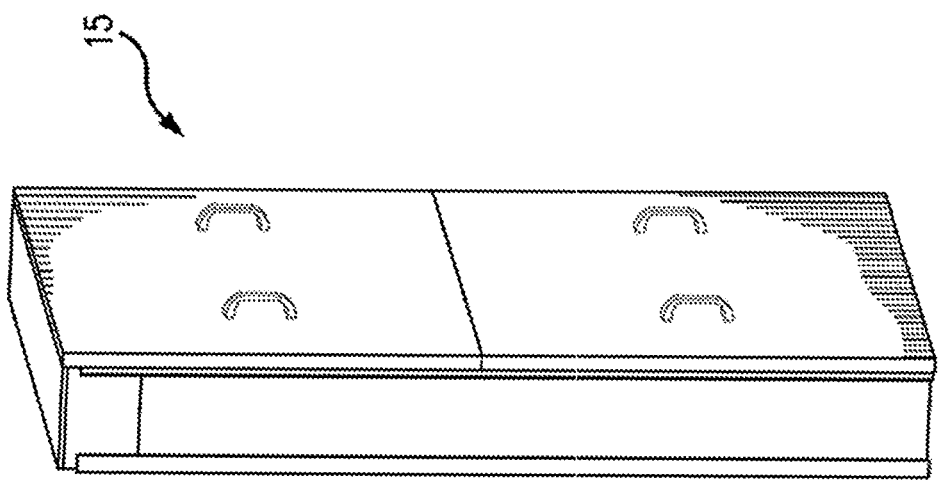
FIG. 5E is a full view in perspective of the enclosure module of this disclosure.
Figure 5D:
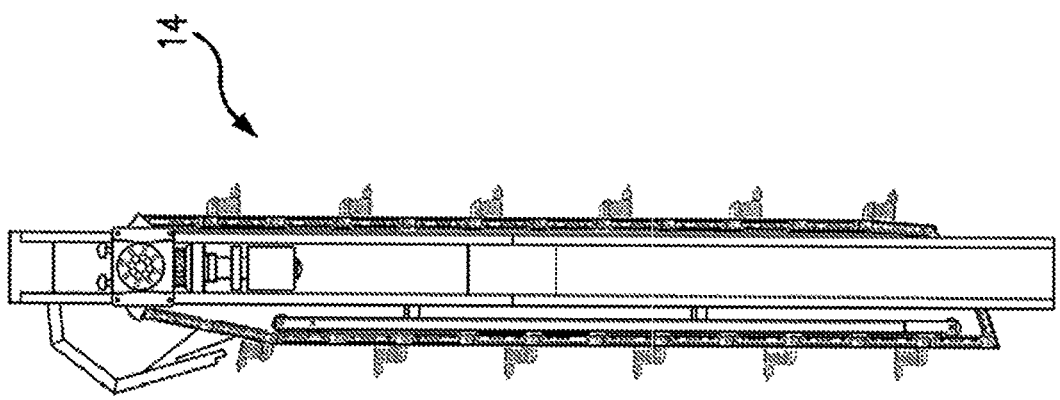
FIG. 5D is a full side view of the drive module and flexing component of FIG. 5C.
Figure 5H:
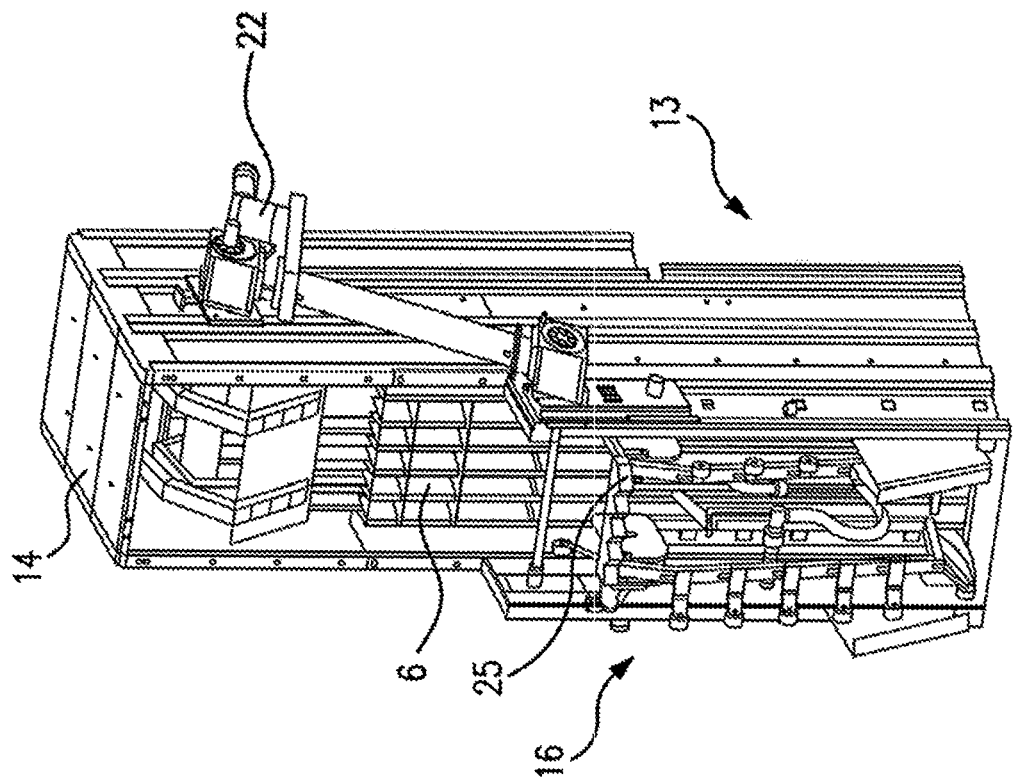
FIG. 5H is a full view in perspective from the front of the flex rake showing an effector module.
Figure 5G:
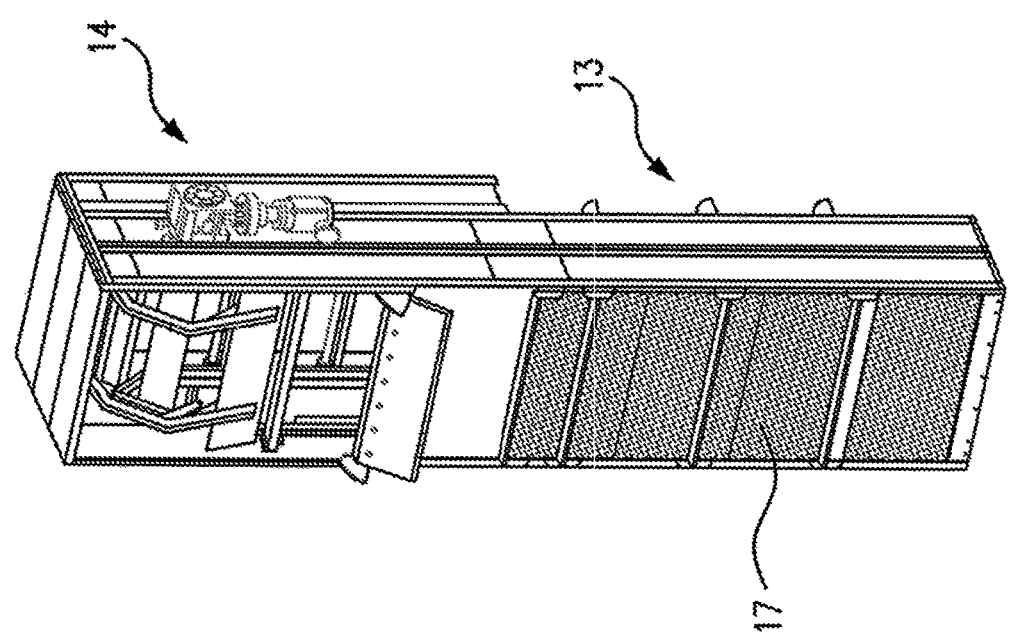
FIG. 5G is a full view in perspective from the front of the flex rake showing a bar screen module.

A very novel feature of this disclosure is the modularity that is built into the flex rake. The newest versions of the flex rake that are covered by this disclosure are designed in modules such that each section of the machine houses different components. The flex rake has a screen module 13, FIGS. 5A and 5B, a drive module 14, FIGS. 5C and 5D, an enclosure module 15, FIGS. 5E and 5F, and an effector module 16. FIGS. 5H, and a portion of an effector module 5I, can also be added as different modules to the flex rake. Each section can be used or exchanged to accommodate various functionalities as needed. FIG. 5G shows the drive module 14 and screen module 13 in combination. FIG. 5H shows a combination of a drive module 14, a screen module 13 and an effector module 16 in combination.

For example, in order to modify a ¼ inch teardrop bar screen 17 as shown in FIG. 5G, to a ¾ inch teardrop bar screen the only module affected would be the screen module 13. The drive module 14 and enclosure module 15 would remain the same. This modularity allows for greater flexibility in design and functionality for the new flex rake equipment. The new equipment could have a ¼ inch teardrop bar screen that has been unchanged except for the screen module that has been changed to a ¾ inch teardrop bar screen. If a customer had this need the flex rake can be adapted to that need without replacing the whole piece of equipment.

The disclosure herein has another novel feature, and that is the capability of not only replacing individual modules, but also to add modules as necessary to increase or change the functionality of the flex rake.

With reference to FIGS. 5G and 5H, there is shown a machine with a ¼ inch teardrop screen in the screen section that is replaced by a 2 mm perforated screen 6 for that section (FIG. 5G). A flexing apparatus is added to the machine to work in conjunction with the 2 mm perforated screen (FIG. 5H). The existing drive section 14 and enclosure sections 15 remain the same except for the addition of a drive shaft and gearbox that is used to power the flexing apparatus module.

Various screen sizes and configurations can be exchanged in the screen section without affecting the other modules. The enclosure section can be modified or exchanged to accommodate larger debris as required without affecting the other sections of the machine. The drive section can be modified to accommodate higher speeds or lifting capacity without affecting the other modules, and other modules can be added to the machine for other capabilities such as the flexing apparatus modules as shown in the FIG. 5H.

It is also contemplated within the scope of this disclosure to completely enclose the flex rake of this disclosure with all of its component parts. Such an enclosure is illustrated in FIGS. 5E and 5F.

Figure 5I:
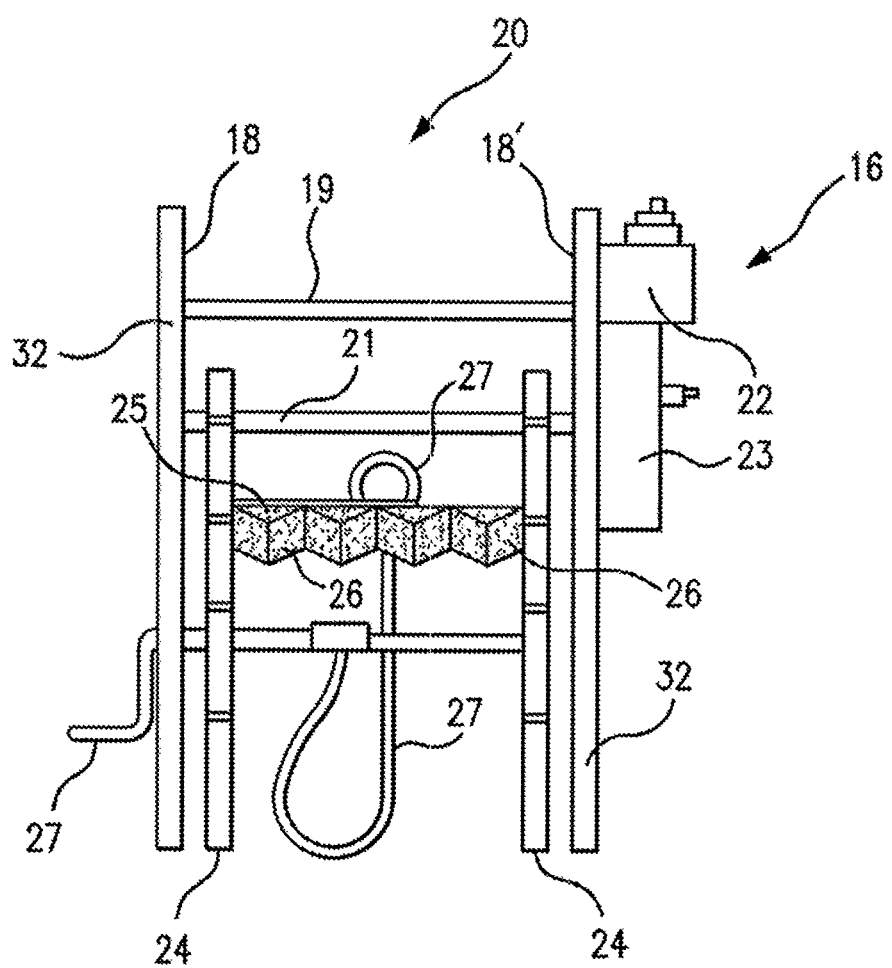
FIG. 5I is a full back view of an effector module showing the water system and other components.

The novel effector module 16 of this disclosure is illustrated in FIG. 5I and consists of a frame 32 consisting of two sides 18 and 18' and a common axle 19 between them which is located near the top 20 of the effector module 16.

There is also shown a second common axle 21 which is located between the sides 18 and 18'. Shown at one end of the axle is a drive mechanism that in this particular case, is commonly driven by a motor 22 shown in FIG. 5H and a drive mechanism 23 consisting of normal accompanying gears and the like. The second common axle 21 is driven by the drive mechanism 23 and drives sprockets (not shown) that have flex linked chains 24 on each end of the second common axle 21 that has attached to it a series of effector plates 25, which effector plates 25 are configured to align with the perforated screen 6 (best shown in FIG. 5H). The effector plates 25 are perforated 26 such that water can flow from them.

The effector plates 25 are equipped to receive water from a delivery system illustrated generally as 27, and are synchronized to allow the flow of water when they are aligned with the perforated plate 6. Only one series of effector plates is shown for clarity, it being understood that there are multiple cross members 25 and multiple series of effector plates 25 in the apparatus.

The removal of debris from a statically positioned perforated screen for the purpose of water filtration requires a very distinct series of dynamics to effectively remove the debris without applying destructive forces to the perforated screen element.

The application of a statically positioned screen inherently requires the debris to be removed from the screen area that is at the effect of the hydrostatic and flow forces of the incoming dirty water. The first dynamic necessity is to reduce or remove the hydrostatic pressure holding the debris against the screen over an area large enough to dislodge the debris relative to the size of the debris.

In the case of the application of a statically positioned perforated screen in municipal waste water, this debris can range from essentially 0.0001 m2 to 0.1 m2. Failure to reduce or remove the hydrostatic force holding the debris to the screen element will result in the failure to effectively remove the debris, unless scraping forces that exceed the hydrostatic forces are applied to the moving of the debris along the screen surface, which in prior art devices, damage occurs to the screen element.

To reduce or remove this hydrostatic force in the case of the perforated plate screen, a device called an Effector™ (Duperon Innovations, Saginaw, Michigan USA) is positioned very near to or intimate to the downstream side of the perforated screen. This device reduces or removes the hydrostatic on the debris by transferring these forces to the surface of the device near or intimate to the screen. In addition to this transfer of force, a diverted flow pattern is created about the device.

This diverted flow pattern has a distinct effect on any debris that is dislodged. This effect can and will move debris along the surface of the screen by utilizing the higher velocity flows diverting around the surface of the Effector device that is near or intimate to the screen. In addition and related to this diverted flow pattern, a low force pocket is formed on the upstream side of the screen in front of the Effector, relative to the size of the Effector and the velocity of the incoming water stream.

This low force pocket forms a space for the debris to gather after it has been removed from the screen. In addition to the function of the Effector, there is a sprayer integrated into the Effector, spraying from the downstream through the screen to the upstream side of the screen. The purpose of the sprayer is to positively dislodge the debris from the screen that has stapled (reached through) the perforations of the screen. The sprayer is positioned relative to the low force pocket.

To collect the dislodged debris and transfer it to discharge point, a skimmer device 5 positioned on the upstream side of the screen 17 moves relative to the position of the Effector plate 25. The position of the skimmer device, relative to the Effector, is critical to the distinct formation of the low force pocket and the direction of the diverted flow pattern in front of the Effector plate 25.

Each of these dynamics are interdependent. The reduction or exclusion of any of these dynamics greatly reduces or negates the ability to remove the debris from the statically positioned perforated screen in the design of the perforated plate. For example, by eliminating the low force pocket in front of the Effector, the sprayer, in and of itself, is unable to neatly remove the range of debris from the screen so the skimmer device can collect the debris for transport. This is due to the effective spray force required for debris with a large area which differs greatly from that required for small debris, in an uncontrolled environment. The combined effects of the low force pocket and the diverted flow patterns, equilibrate the spray forces required to neatly dislodge the debris from the screen and allows the skimmer device 5 to collect the debris.

Figure 8:
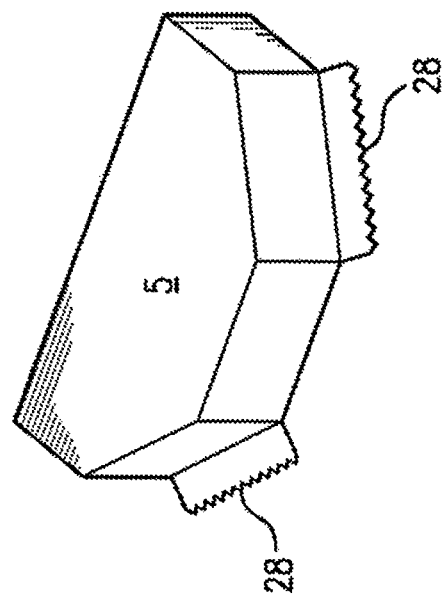
FIG. 8 is an enlarged primary skimmer showing the secondary skimmers in place.
Figure 9:
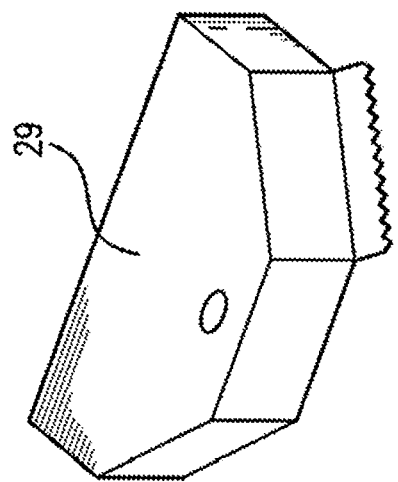
FIG. 9 is a full view in perspective of the plate with attached secondary skimmer that is used to mount the secondary skimmer on the primary skimmer.
Figure 7:
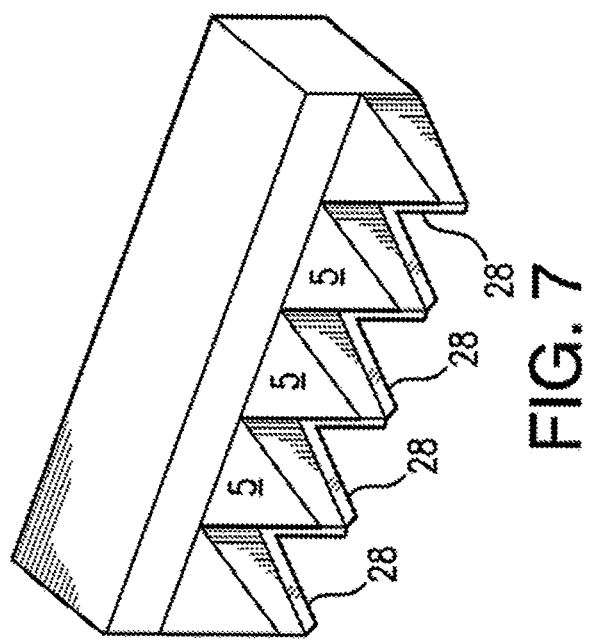
FIG. 7 is a full view in perspective from the front, of a primary skimmer bar showing the skimmers.

In addition to the primary debris removal device used in the clearing of debris from a perforated plate filtration screen, such as a skimmer, scraper or sprayer, a novel secondary skimming device 28 follows after the primary, attached to, or near to the primary device (trash screen), or in a position preceding the introduction of more debris to the perforated screen. Preferred mounting is to have the secondary skimmer mounted on the bottom of the primary skimmer, and extending forward past the leading edge of the primary skimmer, (See FIGS. 7 and 8), using a mounting plate 29 as shown in FIG. 9.

The purpose of this device is to clear fibrous material from the screen that has reached through the perforated screen and is unaffected by typical primary removal devices. This failure of fibrous debris remaining on the screen is called "stapling".

The device is a thin and flexible sheet that is formed, or fixed to its attachment point, in a manner to allow consistent force along its edge, to the surface of the perforated screen. The material hardness of the sheet is designed to be sacrificial to the perforated screen and the thickness of the sheet is designed to maintain a consistent effective sharpness along its edge regardless of wear along the edge of the sheet.

The ability of the device to remove singular fiber or masses containing multiple fibers lies in the combination of the low consistent force and consistent effective sharpness. As the device moves along the inlet side surface of a perforated screen, the sharp edge gathers the fibrous material and moves it along the surface of the perforated screen to a point where it can be discharged.

This device is affixed to the bottom surface of the primary skimmers such that it touches the perforated screen, and hence, the fibrous material positioned in the perforations of the perforated screen. (See FIG. 4A).

What is claimed is:

1. A rake system, comprising:
   a framework;
   a chain configured to traverse over a vertical range;
   an elongated rail pivotably connected to a first support arm and a second support arm;
   the first support arm connected to the elongated rail at a first point and pivotably connected to the framework at a second point disposed within the vertical range of the chain;
   the second support arm connected to the elongated rail at a third point spaced from the first point and pivotably connected to the framework at a fourth point disposed within the vertical range of the chain and spaced from the second point;
   a guide device comprising a roller, guide, or a contour member connected to the elongated rail and configured to engage the chain; and
   wherein the rake system is configured to discard debris.

2. The rake system of claim 1, wherein:
   the elongated rail spans a first distance;
   the chain spans a second distance;
   the first distance is less than the second distance; and
   the chain includes a plurality of chain links.

3. The rake system of claim 1, wherein:
   the rake system includes a plurality of skimmers that are connected to the chain;
   the skimmers are spaced apart along the chain; and
   the skimmers extend outwardly from the chain.

4. The rake system of claim 3, wherein the skimmers are configured to contact a screen of the rake system.

5. The rake system of claim 4, wherein the rake system is configured to receive the debris between the chain and the screen.

6. The rake system of claim 4, wherein the rake system is configured to move the chain such that a skimmer of the plurality of skimmers moves the debris along the screen.

7. The rake system of claim 1, further comprising a sprocket that is operable to drive the chain.

8. The rake system of claim 7, wherein the sprocket is disposed proximate an upper portion of the framework; and
   a lower portion of the framework does not include a sprocket.

9. The rake system of claim 1, further comprising a motor configured to advance the chain; and
   no drive mechanism is located at a bottom of the rake system.

10. The rake system of claim 1, wherein the first support arm comprises a second guide device comprising a roller, guide, or contour member connected to the first support arm;
    wherein the guide device and the second guide device are configured to manipulate the chain.

11. The rake system of claim 1, wherein the framework extends in a vertical direction.

12. The rake system of claim 1, including a screen;
    wherein the rake system is configured to move the debris in a direction parallel to the screen.

13. The rake system of claim 1, including a screen;
    wherein the rake system is configured to move the debris in an upwards direction relative to the framework.

14. The rake system of claim 1, wherein the guide device is operable to apply a force on a skimmer to enhance debris removal.

15. The rake system of claim 1, wherein the system is operable to:
    rotate the chain;
    receive debris between the chain and a screen;
    move the chain relative to the framework; and
    move the debris along the screen, via a skimmer, to discard the debris, wherein the chain is operable to pivot and flex, and move away from the screen to accommodate debris.

16. The rake system of claim 15, wherein moving the debris along the screen includes moving the debris in a direction parallel to the framework.

17. The rake system of claim 15, includes applying pressure to at least one skimmer onto the screen to maintain movement of the debris.

18. The rake system of claim 1, wherein the rake system is configured for the framework to be positioned in a non-vertical orientation and the rake system is further capable of:
    operating the chain in a normal position or a flexed position, and when in the flexed position the chain moves away from a screen when debris encounters the rake system.

19. The rake system as claimed in claim 1, further comprising orienting the framework in a range of 0 to 15 degrees relative to a vertical position.

20. The rake system as claimed in claim 18, further providing a drive motor that is operable to swing relative to the framework when debris moves up the screen.

21. A rake system, comprising:
a framework comprising a top and a bottom, the framework spanning a framework vertical range between the top and the bottom of the framework;
a chain configured to traverse over a chain vertical range, the chain vertical range spanning a distance less than the framework vertical range;
an elongated rail pivotably connected to a first support arm and a second support arm;
the first support arm connected to the elongated rail at a first point and pivotably connected to the framework at a second point disposed within the chain vertical range;
the second support arm connected to the elongated rail at a third point spaced from the first point and pivotally connected to the framework at a fourth point disposed within the chain vertical range and spaced from the second point;
a guide device connected to the elongated rail and configured to engage the chain; and
wherein the rake system is configured to remove debris from a waterway.

22. The rake system as claimed in claim 21, wherein the framework is configured to be positioned in a non-vertical orientation when installed.

23. A rake system, comprising:
a frame;
a chain configured to traverse over a chain vertical range;
a first upper support arm connected to an elongated rail at a first point and pivotably connected to the frame at a second point;
the elongated rail is pivotably connected to the first upper support arm;
a second lower support arm pivotably connected to the elongated rail at a third point and pivotally connected to the frame at a fourth point displaced from the second point, the second point and fourth point arranged vertically with respect to a ground level when the rake system is installed, the second and fourth points being disposed within the chain vertical range; and
a guide device comprising a roller, a guide, or a contour member located at an end of the elongated rail, the guide device is operable to engage the chain;
wherein the rake system is configured such that the chain is operable to move to a flexed position.

24. The rake system as claimed in claim 23, further comprising a second guide device comprising a roller, a guide, or a contour member configured to engage the chain.

25. The rake system as claimed in claim 23, further comprising a sprocket and a drive motor located at an upper end of the frame, and no sprocket is located at a lower end of the frame.

26. A rake system, comprising:
a frame;
a chain;
a first upper support arm connected to an elongated rail at a first point and pivotably connected to the frame at a second point;
the elongated rail is pivotably connected to the first upper support arm;
a second lower support arm pivotably connected to the elongated rail at a third point and pivotally connected to the frame at a fourth point displaced from the second point, the second point and fourth point vertically stacked with respect to each other such that the second point is disposed above the fourth point arranged vertically with respect to a ground level when the rake system is installed; and
a guide device comprising a roller, a guide, or a contour member located at an end of the elongated rail, the guide device is operable to engage the chain;
wherein the rake system is configured such that the chain is operable to move to a flexed position to assist in discarding debris.

27. The rake system as claimed in claim 26, further comprising a second guide device comprising a roller, a guide, or a contour member configured to engage the chain.

28. The rake system as claimed in claim 26, further comprising a sprocket and a drive motor located at an upper end of the frame, and no sprocket is located at a lower end of the frame.

* * * * *